Apr. 24, 1923.
W. H. BAUERT
1,453,236
AUTOMATIC ADDITIONAL AIR VALVE FOR COMBUSTION ENGINES
Filed Feb. 18, 1920
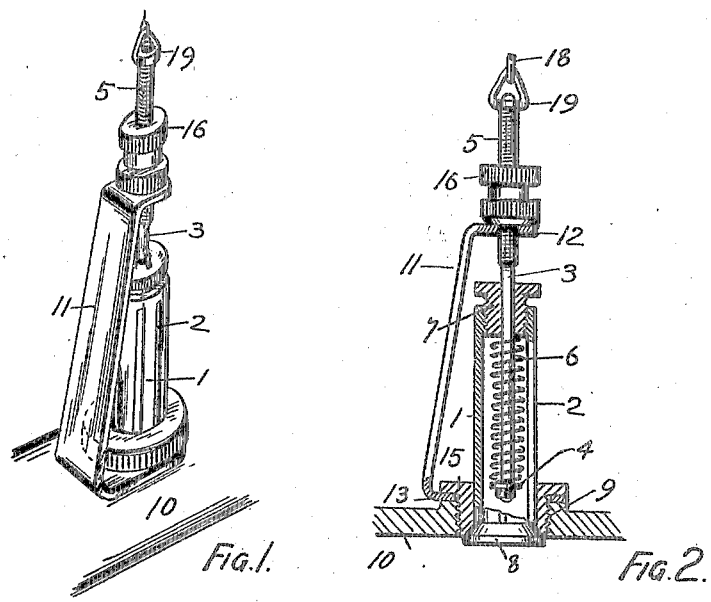
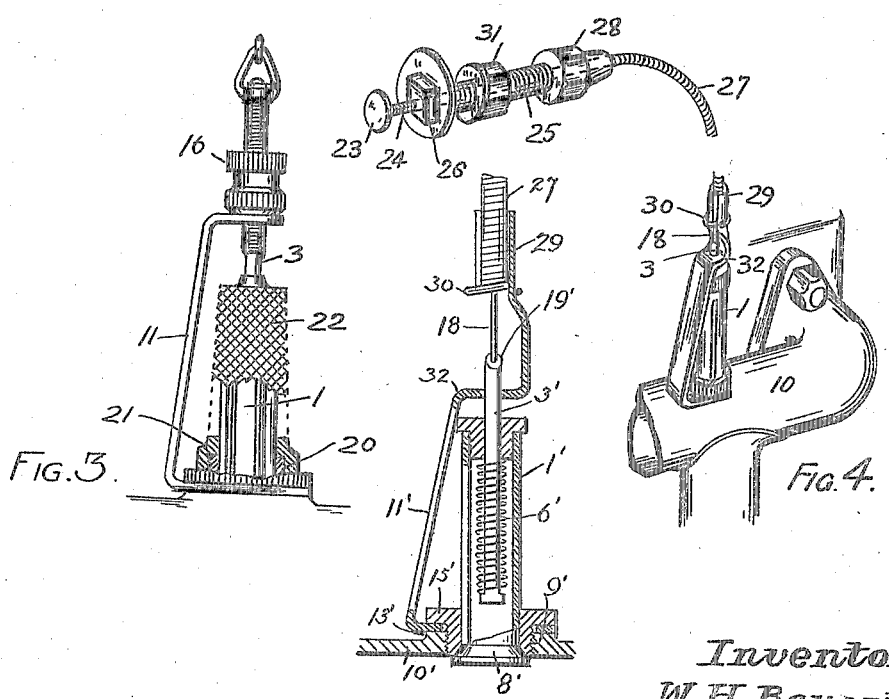
Inventor
W. H. Bauert,
By K. R. Kerslake
Attorney Patented Apr. 24, 1923.

1,453,236

UNITED STATES PATENT OFFICE.

WILLIAM HENRY BAUERT, OF ROSEVILLE, NEAR SYDNEY, NEW SOUTH WALES, AUSTRALIA.

AUTOMATIC ADDITIONAL AIR VALVE FOR COMBUSTION ENGINES.

Application filed February 18, 1920. Serial No. 359,643.

*To all whom it may concern:*

Be it known that I, WILLIAM HENRY BAUERT, a subject of the King of Great Britain and Ireland, residing at Shirley Road, Roseville, near Sydney, New South Wales, Australia, have invented certain new and useful Improvements in Automatic Additional Air Valves for Combustion Engines, of which the following is a specification.

This invention relates to automatic additional air valves for combustion engines. It refers to that type of air admission valve which is fitted to the induction manifold of the engine between the throttle and the inlet valve, and which serves to admit additional air to the manifold for the dilution of the fuel mixture inducted thereto from a carbureter or mixing valve when the throttle is open, or for braking purposes when the throttle is closed. Such valves are opened or closed proportionately to the variations of subatmospheric pressure created in the manifold by movements of the engine piston.

My valve is so constructed that the admission of additional air to the induction manifold of the engine may be automatically controlled and permitted only in proportion to the depression existing in the manifold under engine running conditions. Further, my valve is adapted to be manually controlled for the purpose of prohibiting the admission therethrough of additional air to the manifold. Moreover, the means for governing the movements of the valve for the admission of additional air to the manifold may be positioned within easy reach of the driver of an automobile having an engine installed thereon which is fitted with the valve, or such means may be so positioned in relation to the valve when it is connected to the manifold that adjustment of such means will only be possible directly thereat.

My additional air valve comprises a valve proper fitted with a loading spring, a removable seating therefor adapted to be fitted to the manifold, means for adjusting the tension of the loading spring and for supporting the valve, and means adapted to act as a guide for such spring tension adjusting means.

The invention is illustrated in the accompanying drawings in which Fig. 1 is a perspective view of one construction of valve mounted on an engine manifold; Fig. 2 is a longitudinal section thereof; Fig. 3 is an alternative construction of valve to that shown in Fig. 1; Fig. 4 is a broken perspective view of a modified form of valve connected with control means adapted to be installed on the dashboard of a motor vehicle, and Fig. 5 is a sectional elevation of a modification of the invention of Fig. 4.

Referring to the drawings the valve consists of a tubular piston 1 which is provided with a series of longitudinal slits 2, which are preferably made parallel to each other. Fitted within the piston 1 is the plunger rod 3 having a collar 4 at its lower end and optionally screw threaded at the portion marked 5 said rod being slidable through the bracket 12. The collar 4 must be of smaller diameter than the inner diameter of the piston 1. Mounted on the rod 3 is a coiled loading spring 6, its ends abutting respectively against the collar 4 and a nut 7 which is threaded to fit the tapped head of the piston 1; the latter is formed with a closed bottom 8 which serves as a valve face, adapted to seat against the removable nipple 9 which is capable of being screwed into the wall 10 of the induction manifold of an engine.

On the nipple 9 is the collar 15; this collar serves to secure the lower end of the yoke 11 between it and the wall 10 of the manifold. The yoke 11 is furnished with two arms 12 and 13 both of which are holed to permit respectively the plunger rod 3 and the nipple 9 to be positioned therethrough.

If the tension on the spring 6 is to be regulated directly at the engine manifold, the tension adjusting nut 16 is provided for the rod 3, and the latter is threaded at that portion thereof which is marked 5 Fig. 2. In such circumstances the nut 16 is also adapted to hold the rod 3 and consequently the piston 1 against the seating on the nipple 9, when the yoke 11 is positioned on the valve with its arm 13 on the nipple and its arm 12 abutting the nut 16. Tension on the spring 6' may, however, be regulated for instance, as shown in Figure 5, by means of a flexible wire or cord 18, such as a Bowden wire, one end of which is affixed as at 19' or otherwise to the plunger rod 3', whilst its other end is carried to control means situated on the dashboard or other convenient part of an automobile within easy reach of the driver. When it is desired to increase tension on the spring 6' or vice versa tension is respectively applied to or relaxed on the flexible connection 18. In Fig. 5, the remaining parts correspond in construction to the corresponding parts as shown in Figs. 1 to 3, the numerals therefor being primed.

The control means for the valve 1 shown in Fig. 4 are adapted to be fitted to the dashboard of an automobile and consist of a plunger head 23 having a screwed stem 24 which is made a sliding fit for the externally threaded tubular socket 25 on which is the shoulder 26. The flexible wire or cord 18 which is fastened at one end to the rod 3 is carried in a flexible housing comprising the wire helix 27 and is fastened at the other end to the inner end of the stem 24 of the plunger head 23. To retain one end of the housing 27 in contiguity with the socket 25 the tapped sleeve nut 28 is provided; this nut is holed and tapered at one end, whilst its other end is adapted to be screwed on the socket 25. One end of the housing 27 is threaded through the opening in the nut 28 and such end is made to abut the inner end of the socket 25; its other end is fastened to the split socket 29 at the head of the yoke 11. The housing wire 27 is attached to the socket 29 by uncoiling a portion of its end and passing such end into the slit in the socket and bending the uncoiled end of the wire around the socket 29 as shown at 30 Fig. 4. A tapped nut 31 which is adapted to run on the socket 25 enables the plunger head 23 and the socket 25 to be secured to the dashboard of a motor vehicle. The dashboard is holed to enable the stem of the socket 25 to be threaded through it until the collar 26 abuts it. The nut 31 is then screwed on the socket 25 against the dashboard to hold the plunger head 23 and socket 25 in position thereon, and the nut 28 may then be secured to the inner end of the socket 25. To enable the yoke 11 to act as a guide for the rod 3 it is bent as shown at 32, Fig. 5.

In the construction of valve shown in Fig. 3, the nipple 9 is provided with an extension 20 on which is mounted a sleeve 21. This sleeve is fitted with a screen constructed of gauze or other open meshed metal fabric 22 through which air may be admitted to the piston 1, but whose mesh is sufficiently fine enough to prevent passage of dirt and grit through the piston 1 into the engine cylinder via the manifold.

In operation, the piston valves 1 and 1' are normally set so that they will be seated on the nipples 9, 9' when the engine is not under load. This is effected by proportioning the tension on the corresponding springs 6 and 6'. The tension of the spring 6 may be adjusted by turning the nut 16 to compress it, and the spring 6' compressed by applying tension to the wire 18 through the control means on the vehicle, to suit the varying degrees of pressure in the manifold under running conditions of the engine. The air admission through the valves to the manifold is thus graduated to effect the desirable degree of dilution of the normal charge of fuel for all ranges of engine speed and throttle adjustment, or for braking purposes.

What I claim as my invention and desire to secure by Letters Patent is:—

1. A device of the type herein described comprising a valve consisting of a hollow closed-bottom piston having air admission ports in its side walls, said bottom being adapted to act as a valve face and to coact with a movable seating capable of being secured to an engine manifold, a plunger rod within said piston and extending through the head thereof, a coiled spring mounted on said rod within said piston, and means adapted to support said valve in relative position to said seating and to vary the tension of said spring.

2. A device of the type herein described comprising a valve consisting of a hollow closed-bottom piston having air admission ports in its side walls, said bottom being adapted to act as a valve face and to coact with a removable nipple seating capable of being screwed into the walls of an engine manifold, a plunger rod within said piston and extending through the head thereof, a collar on the foot of said rod, a coiled spring mounted on said rod within said piston, a nut fitting the tapped head of said piston, a flexible wire adapted to be detachably secured to said rod and to means for varying the tension on said spring, and a guide yoke for said rod and wire.

3. A device of the type herein described comprising a valve consisting of a hollow closed-bottom piston having air admission vents in its side-walls, said bottom being adapted to act as a valve face and to coact with a removable nipple seating capable of being screwed into the wall of an engine manifold, a plunger rod within said piston having a threaded extension projecting through the head thereof, a collar on the foot of said rod, a coiled spring mounted on said rod within said piston, a nut fitting the tapped head of said piston, a guide yoke for said rod provided with holed flanges adapted to fit respectively around said nipple seating and said rod, and a tapped nut running on said threaded rod extension for supporting said valve and for adjusting tension on said spring.

4. A device of the type herein described comprising a valve consisting of a hollow closed-bottom piston having a series of air admission slits disposed longitudinally in its side walls, said bottom being adapted to act as a valve face, a seating for said valve consisting of a nipple adapted to be screwed into an engine manifold and having a shoulder thereon, a plunger rod within said piston and extending through the head thereof, a collar on the foot of said rod, a coiled spring mounted on said rod within said piston, a nut fitting the tapped head of said piston, a flexible wire adapted to be detachably secured to said rod and to means for varying the tension on said spring, a guide yoke for said wire and rod, and a holed flange on said yoke adapted to be secured around said seating between the shoulder thereof and said manifold.

In testimony whereof I have affixed my signature.

WILLIAM HENRY BAUERT.